United States Patent [19]
Wallmeier

[11] Patent Number: 5,526,345
[45] Date of Patent: Jun. 11, 1996

[54] METHOD FOR STATISTICAL MULTIPLEXING

[75] Inventor: Eugen Wallmeier, Eichenau, Germany

[73] Assignee: Siemens Aktiengesellschaft, Munich, Germany

[21] Appl. No.: 353,695

[22] Filed: Dec. 12, 1994

[30]   Foreign Application Priority Data

Dec. 23, 1993 [EP]   European Pat. Off. ............... 93120828

[51] Int. Cl.[6] .................................................. H04L 12/56
[52] U.S. Cl. ............................ 370/17; 370/60.1; 370/61; 370/94.2; 370/112
[58] Field of Search ............................... 370/17, 56, 58.1, 370/58.2, 58.3, 60, 60.1, 61, 79, 84, 85.2, 85.3, 94.1, 94.2, 112, 118

[56]               References Cited

FOREIGN PATENT DOCUMENTS

0498092A1  8/1992  European Pat. Off. ......... H04L 12/56
0544034A1  6/1993  European Pat. Off. ......... H04L 12/56
WO91/13505  9/1991  WIPO .............................. H04L 12/56

OTHER PUBLICATIONS

Telecommunications Standardization Sector, Study Group 13, Jul., 1993, "Resource Allocation Using Sustainable Cell Rate and Burst Tolerance Traffic Parameters", pp. 1–5.

Primary Examiner—Alpus H. Hsu
Attorney, Agent, or Firm—Hill, Steadman & Simpson

[57]                 ABSTRACT

A method for statistical multiplexing wherein message cells transmitted according to an asynchronous transfer mode are supplied to a multiplexer on input lines and are forwarded on an output line. In the method, since an average message cell rate and a maximum number of message cells briefly exceeding the average message cell rate are reserved for each connection, a message cell rate is assured for each connection that is at least as high as the average message cell rate given a limited delay.

9 Claims, 4 Drawing Sheets

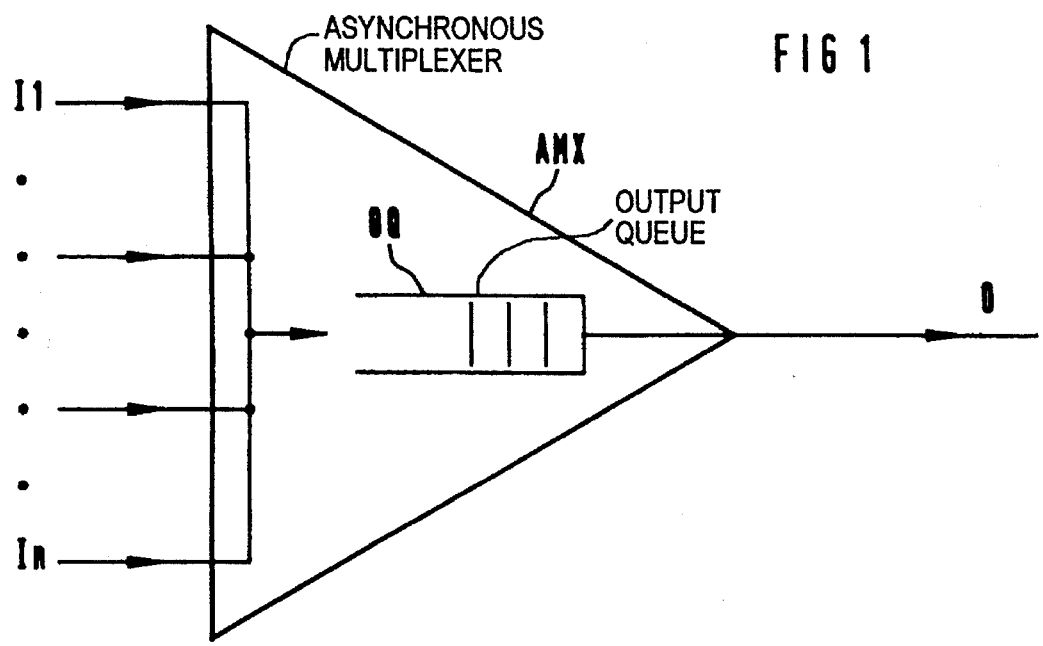
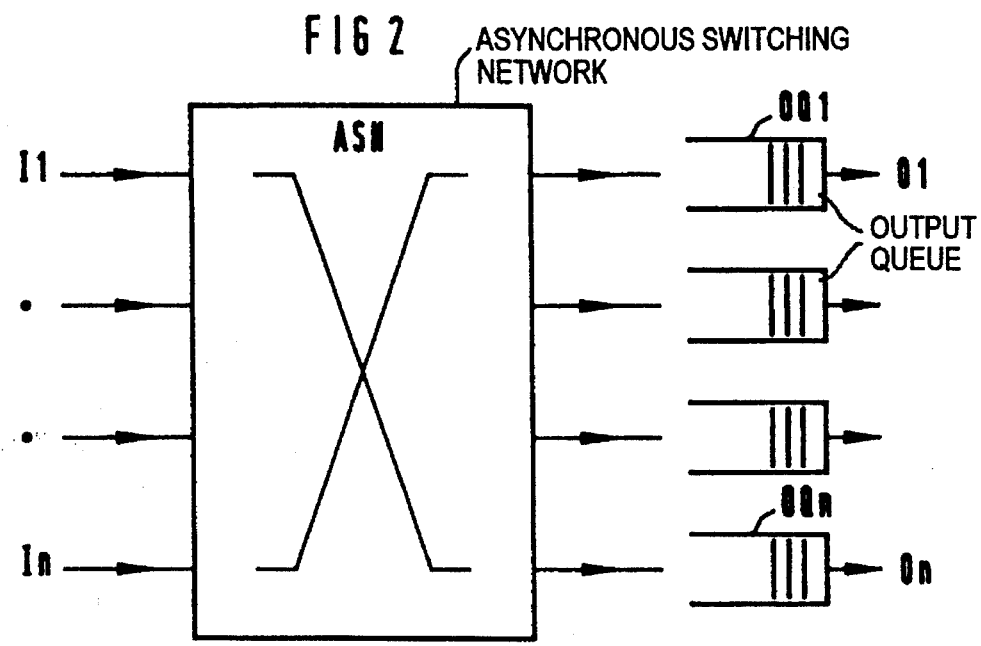

METHOD FOR STATISTICAL MULTIPLEXING

BACKGROUND OF THE INVENTION

The invention is directed to a method for the statistical multiplexing of message cells in an arrangement, wherein a plurality of input lines and one output line are established;

as a result whereof a message cell cycle is established by the transmission duration of a message cell given a defined transmission bit rate;

as a result whereof message cells having a constant length are transmitted during the course of virtual connections according to an asynchronous transfer mode;

as a result whereof a plurality of message cells can be brought in on the input lines in every message cell cycle and at most one message cell can be forwarded onto the output line; and as a result whereof a minimum message cell transmission rate and a maximum number of message cells upwardly exceeding the message cell transmission rate are established for every virtual connection.

The subscribers of communication systems that make use of the transmission principle of statistical multiplexing make demands of performance criteria, such as loss probability and delay. These demands can be met, for example, in that a bit rate reserving that is equal to the peak bit rate of the connection is undertaken for each connection. As is known, this peak bit rate reserving only works effectively when the peak bit rates of the individual connections respectively only amount to a small fraction of the overall transmission bit rate of the connecting path.

A reference having the title "Resource Allocation Using Sustainable Cell Rate and Burst Tolerance Traffic Parameters" in which a new algorithm is recited was presented at the Telecommunications Standardization Sector, Study Group 13, Working Party, Geneva, July 1993. This algorithm is based on the declaration of an average message cell rate and of a maximum number of message cells briefly exceeding the average transmission rate. What is critical for this algorithm is that a limited number of memory locations is to be reserved for each connection. Beyond this, this algorithm assures a minimum message cell rate for each connection that is at least as high as the average message cell rate reserved for the respective connection. Beyond this, the maximum delay of a message cell in this algorithm is limited by the relationship of the maximum plurality of message cells exceeding the average message cell rate to the average message cell rate, A technical realization of this algorithm is not possible according to the estimate provided in the above described reference.

SUMMARY OF THE INVENTION

It is an object of the invention to specify a technical realization for the aforementioned algorithm.

The problem is resolved in that a memory means having a plurality of memory locations each respectively accepting a message cell is established in the arrangement;

a time axis formed with a plurality of memory elements is established, this time axis being progressively cyclically driven by a time pointer with every message cell cycle;

a time rank is consequently defined for every incoming message cell upon evaluation of the quantities established for the corresponding virtual connection, said time rank indicating the latest permissible point in time by which this message cell must be forwarded;

a message cell is consequently stored in a memory location and the address of this memory location is stored in the memory element of the time axis that corresponds to the corresponding time rank;

when an entry in a memory element driven by the time pointer references the memory location of a message cell, this message cell is consequently entered into a read-out list for an immediate forwarding onto the output line;

when no message cell is entered into the read-out list in the momentary message cell cycle, a read pointer consequently progresses in the time axis up to the entry for a message cell having the next successive time rank, and effects an entry of only the one message cell into the read-out list; and when a time rank that lies between the momentary positions of the time pointer and the read pointer is calculated for an incoming message cell, this message cell is consequently immediately entered into the read-out list.

The invention realizes an algorithm that assures the reserved message cell rate for every connection given a maximum delay, whereby the plurality of memory locations to be offered for the individual connections is limited. When the arrival times of successive message cells of a connection never amounts to less than the inverse of the average message cell rate, all message cells of the connection leave the read-out list in the message cell cycle in which they arrive. When the average message cell rate of a connection is selected equal to the peak message cell rate, the message cells belonging to this connection do not experience any greater delay than in an arrangement having peak bit rate reservation. The plurality of memory locations that can be occupied by a connection is limited by a leaky bucket in the arrangement of the invention, this leaky bucket monitoring the adherence to the average message cell rate. A flooding of the memory locations in message cells of one connection that persistently exceeds its average message cell rate is thus precluded. Further advantages may be seen wherein, on the one hand, an overtaking of prioritized message cells (prioritized since, for example, they belong to time-critical connections) is possible, and, second, a degradation of the other connections due to a connection that exceeds the parameters established for it is precluded. Beyond this, no restriction of the proportion of the message cell rate of an individual connection to the overall message cell rate of the output line is established for an effective statistical multiplexing.

BRIEF DESCRIPTION OF THE DRAWINGS

FIG. 1 is a schematic illustration of a multiplexing means in which the statistical multiplexing method of the invention can be employed;

FIG. 2 is a schematic illustration of a switching equipment unit in which the statistical multiplexing method of the invention can be employed;

DESCRIPTION OF THE PREFERRED EMBODIMENTS

Figure 3:
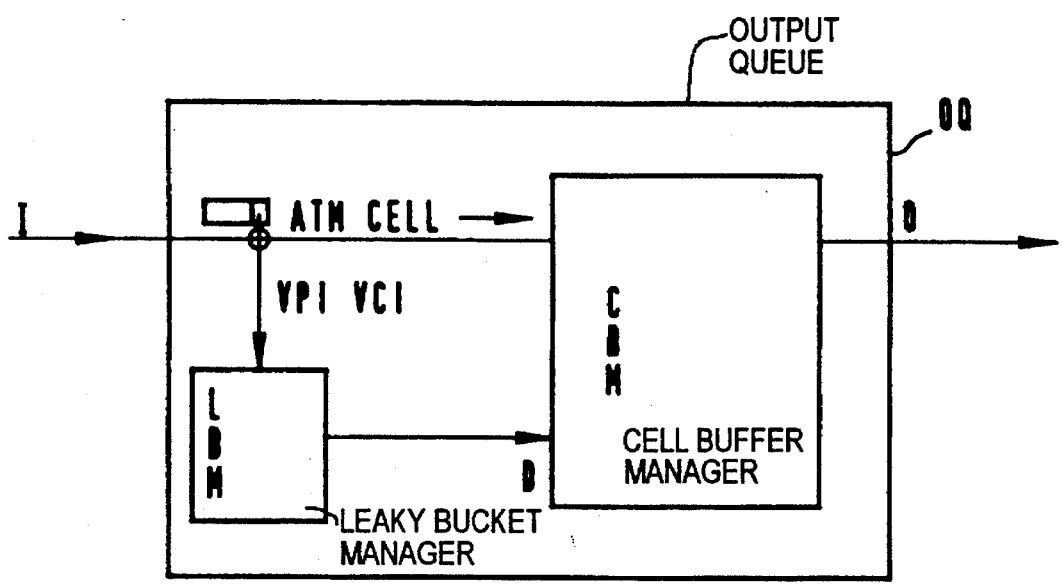
FIG. 3 is a schematic illustration of a means for a wait list employed in the statistical multiplexing method of the invention.
Figure 4:
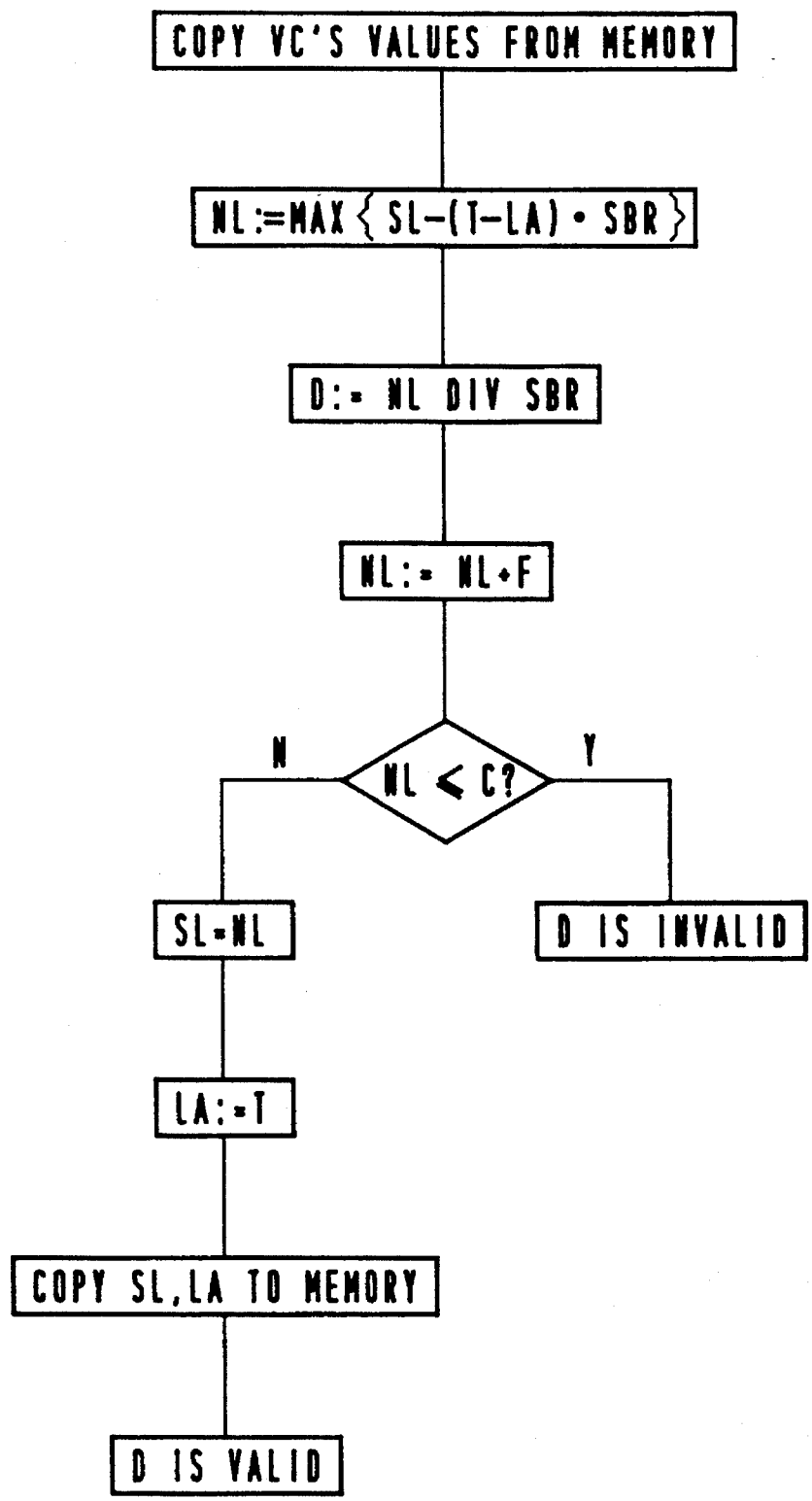
FIG. 4 is a flow chart of a leaky bucket procedure employed in the statistical multiplexing method of the invention.
Figure 5:
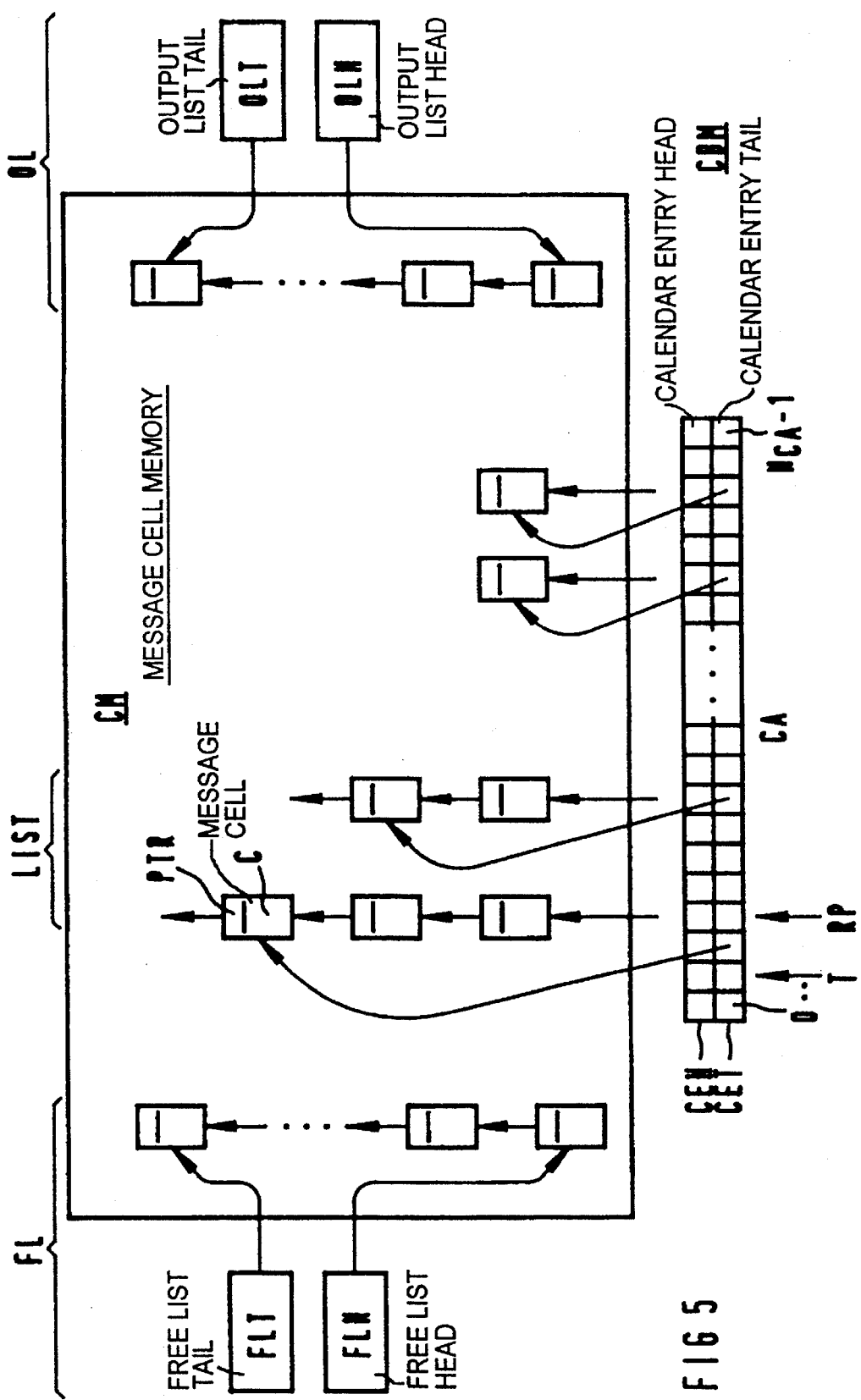
FIG. 5 shows further details of the block referenced CBM in FIG. 3.

FIGS. 1 and 2 respectively show a multiplexing means and a switching equipment unit in which the statistical multiplexing method of the invention can be employed. FIGS. 3, 4, and 5 show respectively a means for a weight list, a flow chart of a leaky bucket procedure, and details of the block referenced CBM in FIG. 3 respectively for the statistical multiplexing method of the invention.

The asynchronous multiplexer AMX of FIG. 1 is capable of connecting through message cells that arrive on input lines connected to the inputs I1 . . . In onto an output line connected to the output O. An output queue OQ is allocated to the output.

Let the message cells be established by message cells having a fixed length that are transmitted according to an asynchronous transfer method, for example according to ATM (asynchronous transfer mode) in the course of virtual connections VC. Every message cell comprises a useful data part having a length of, for example, 48 octets, and comprises a message cell header preceding this useful data part and having, for example, a length of 5 octets. A destination information (virtual path identifier/virtual channel identifier) is co-transported in the message cell header, this destination information indicating the corresponding virtual connection. The transmission of the actual message signals occurs in the useful data part. What are thereby to be understood by message signals are message and text signals as well as voice or, respectively, image signals in digital form. Dummy cells corresponding to the message cells are transmitted, moreover, in transmission pauses. The transmission duration of a message cell at a given message cell rate corresponds to a message cell cycle.

The switching equipment of FIG. 2 is capable of connecting through message cells that arrive on input lines connected to the inputs I1 . . . In onto the outputs O1 . . . On via a traditional asynchronous switching network ASN. An output queue OQ1 . . . OQn is allocated to every output.

The queuing memory of the multiplexer of FIG. 1 and the queuing memory of the switching equipment of FIG. 2 serve the purpose of resolving access collisions between message cells that arrive on different input lines and are to be forwarded onto the same output line. A further job is established by a matching of the sequence of message cells output by the queuing memory to the message cell rate established for the corresponding output line. The plurality of memory locations in the queuing memory is dimensioned according to the maximally allowable number of message cells between two successive message cells of a virtual connection that comprises a low message cell rate and real time demand. When a virtual connection having a low message cell rate and real-time demand such as, for example, a voice connection is established, then the queuing memory typically comprises a plurality of 90 memory locations.

FIG. 3 shows further details of the structure of the queuing memory. A copy of the destination information of every message cell incoming on an input line IL is supplied to a leaky bucket manager LBM, whereas the message cell is supplied to a receiver (not shown in greater detail) of a cell buffer manager CBM. Leaky bucket quantities are stored in the leaky bucket manager for every momentarily established virtual connection. The leaky bucket quantities relate to a minimum message cell transmission rate (SBR) established upon set up of the virtual connection;

the momentary slop level SL or, respectively, new level NL of the leaky bucket; and the point in time of the last arrival LA of a momentarily last message cell belonging to the same virtual connection.

Further leaky bucket quantities shared in common by all virtual connections relate to the fill rate F of the leaky bucket corresponding to a message cell;

a maximum capacity C of the leaky bucket; and the momentary time T.

A leaky bucket procedure set forth in greater detail below is implemented for each destination information supplied to the leaky bucket manager upon evaluation of the leaky bucket quantities stored for the corresponding virtual connection. The leaky bucket procedure produces a delay D that indicates by how many message cell cycles the corresponding message cell would be delayed if it were forwarded onto the output line with the corresponding minimum message cell rate from a FIFO (first-in-first-out) memory belonging to the corresponding virtual connection. The delay D thus indicates at what latest allowable point in time proceeding from the momentary time the corresponding message cell must be forwarded onto the output line.

The flow chart of FIG. 4 illustrates the operational sequence in the leaky bucket manager. For every incoming message cell, the leaky bucket quantities of the corresponding virtual connection are first transferred from the memory into the procedure. A new capacity is then calculated by reducing the most recently stored capacity by the outflow rate since the arrival of the hitherto last message cell that belongs to the same virtual connection, and which is intended for forwarding. The delay D is calculated from the new capacity by division with the minimum message cell transmission rate. After this, the capacity is incremented by the fill rate corresponding to a message cell. The capacity then deriving is investigated to see whether the maximum capacity is upwardly exceeded. When the maximum capacity is not exceeded (branch N for no), then the momentary capacity and the momentary time for the corresponding connection are stored. When the maximum capacity is upwardly exceeded (branch Y for yes), then the delay calculated for the message cell under consideration is set to a predetermined value, for example ZERO. In both instances of the branch, the delay calculated for the message cell under consideration is supplied to the memory means.

FIG. 5 illustrates further details of the memory means. A message cell memory CM comprises a plurality of, for example, 90 memory locations that can be selected by individual addresses. Every memory location is capable of accepting a message cell C and a pointer Ptr. With the assistance of the pointer Ptr, a plurality of memory locations can be united to form a list, whereby the pointer Ptr of a memory location addresses another memory location. Let the pointer Ptr in the respectively last memory location of a list comprise a special address, for example ZERO, and thus indicate the end of the list. The memory locations momentarily not occupied with message cells are united to form a free list FL, whereby a free list head FLH addresses the first memory location and a free list tail FLT addresses the last memory location.

A time axis (calendar CA) is formed with a plurality 0 . . . $N_{CA-1}$ of pairs of memory elements. Let the plurality of pairs of memory elements equal the plurality of memory locations. The pairs of memory elements are progressively cyclically driven by a time pointer T (present time) indicating the momentary time. The cyclical drive, for example, can occur with a counter that, on the one hand, is capable of assuming the same number of conditions as the number of pairs of memory elements and that, on the other hand, is incremented with every message cell cycle. The address of a memory location can be stored in every memory element. In every pair of memory elements, the memory element shown in the upper line in FIG. 5 has the calendar entry head CEH allocated to it, and the memory element shown in the bottom line in FIG. 5 has the calendar entry tail CET for the corresponding message cell cycle allocated to it.

When the prescribed value (for example, ZERO) is supplied to the memory means for a message cell intermediately stored in the receiver, then this message cell is discarded. When a delay deviating from the prescribed value is supplied to the memory means for a message cell intermediately stored in the receiver, then the message cell is handled in the following way.

The message cell is stored in the memory location of the free list that the free list head addresses at the moment. This memory location is removed from the free list. Proceeding from the pointer T, a message cell cycle is defined by addition of the delay calculated for the message cell under consideration, this corresponding to the latest allowable time for forwarding the message cell under consideration. In general, the address of the memory location wherein the message cell under consideration is located will be stored in the pair of memory elements corresponding to this message cell cycle. When the address of a memory location is already stored in a pair of memory elements, then the pointer Ptr of the hitherto last memory location belonging to the same message cell cycle addresses the memory location of the message cell under consideration.

When the address of a memory location is already stored in a pair of memory elements, then the address of the memory location of the message cell under consideration is stored, on the one hand, as pointer Ptr in the memory location of the hitherto last message cell belonging to the same message cell cycle and, on the other hand, is stored in the memory element that belongs both to this message cell cycle as well as to the calendar entry tail CET. The memory locations of message cells that belong to the same message cell cycle are thus combined to form a list. Let the pointer Ptr in the memory location of a memory cell that was respectively allocated to a message cell cycle as the hitherto last memory cell comprise a specific value, for example ZERO, and thus indicate the hitherto last message cell of this message cell cycle.

A read pointer RP indicates the pair of memory elements that at least addresses the memory location of a message cell to be forwarded at the moment. The read pointer can either be identical in position with the time pointer or—as to be set forth in greater detail below—can lead the time pointer.

Memory locations of message cells that, as shall be set forth in yet greater detail below, are intended for immediate forwarding, are united to form an output list OL, whereby the pointer Ptr of a memory location references the respectively following memory location. An output list head OLH references the memory location residing at the start of the output list. An output list tail OLT references the memory location residing at the end of the output list. A message cell is forwarded onto the output line from the output list—in the sequence of entry—with every message cell cycle.

The following procedures are implemented in the given sequence in the cell buffer manager in every message cell cycle.

1) At the start of each and every message cell cycle, the value of the time pointer is incremented. When a message cell is to be forwarded onto the output line in the momentary message cell cycle, then the corresponding memory location is attached to the end of the free list. Let it be mentioned for the purpose of a greater understanding that the address of this memory location was already stored in a transmitter (not shown in greater detail) in the preceding message cell cycle and is no longer needed.

2) When a message cell arrives, then the latest allowable time calculated for it is compared to the time interval that is limited, on the one hand, by the time pointer T and, on the other hand, by the read pointer RP. When the calculated time lies within this interval, then the memory location of the message cell under consideration is attached directly to the end of the output list and the position of the read pointer is set equal to the position of the time pointer. When the calculated time indicates a time later than the momentary position of the read pointer, the address of the memory location of the message cell under consideration is allocated to the pair of memory elements that corresponds to the required message cell cycle.

When a plurality of message cells arrive during a message cell cycle, then message cells are stored in the memory means up to a prescribed plurality within this message cell cycle. Message cells that proceed beyond the prescribed plurality are stored in the following message cell cycle.

3) When the time pointer T drives a pair of memory elements during the momentary message cell cycle, a reference being made therein to at least one memory location of a message cell, then these memory locations are joined to the output list and the entry in this pair of memory elements is erased.

4) When at least one message cell is located in the output list, then the message cell located at the start of the output list is selected for forwarding during the next message cell cycle. When no message cell is located in the output list, then the read pointer RP (proceeding from the momentary position of the time pointer T) is forwarded until it finds a pair of memory elements having an entry. When the read pointer does not find an entry in the momentary message cell cycle, then the search is continued in the next message cell cycle. When the read pointer thus leads the time pointer, then only one message cell (the message cell located at the start of the list in case of a list) is united with the output list for the pair of memory elements driven by the read pointer, and is selected for forwarding during the next message cell cycle. When this message cell was a matter of the last message cell that is allocated to a pair of memory elements, then the entry in this pair of memory elements is erased. When all pairs of memory elements comprise no entry, the read pointer is set equal to the position of the time pointer.

Although various minor changes and modifications might be proposed by those skilled in the art, it will be understood that I wish to include within the scope of the patent warranted hereon all such changes and modifications as reasonably come within my contribution to the art.

I claim as my invention:

1. A method for statistical multiplexing of message cells in a multiplexer having a plurality of input lines and only one output line, comprising the steps of:

providing a message cell cycle according to a transmission duration of a message cell given a defined transmission bit rate;

bringing in a plurality of message cells on the input lines in every message cell cycle, and forwarding at most one message cell onto the output line, the message cells being forwarded having constant length and being transmitted in the course of virtual connections according to an asynchronous transfer mode;

providing a minimum message cell transmission rate, and providing a maximum number of message cells exceeding the minimum message cell transmission rate for every virtual connection;

providing a memory having a plurality of memory locations for respectively accepting a message cell;

forming a calendar with a plurality of memory elements, said calendar being progressively cyclically driven by a time pointer with every message cell cycle;

identifying a time slot for every incoming message cell upon evaluation of quantities established for the corresponding virtual connection, said time slot indicating a latest allowable time the incoming message cell must be forwarded;

storing a message cell in a memory location and storing an address of said memory location in a memory element of the calendar that corresponds to the corresponding time slot;

when a memory element with a stored address of a memory location is met by the time pointer indicating a memory location of a message cell, then entering said message cell into an output list for an immediate forwarding onto the output line;

when no message cell is entered in the output list in a momentary message cell cycle, forwarding a read pointer in the calendar up to an entry for a message cell having a next-successive time slot, an entry of only the one message cell into the output list being effected; and when a time slot that lies between momentary positions of the time pointer and of the read pointer is identified for an incoming message cell, directly entering said message cell into the output list.

2. A method for statistical multiplexing according to claim 1 including the further steps of:

providing a memory location with a capability of accepting a message cell as well as a pointer; and uniting message cells to form a list of memory locations wherein a pointer of one memory location addresses a memory location of another message cell.

3. A method according to claim 1 including the step of uniting a newly incoming message cell that must be forwarded by a same latest allowable time as another message cell hitherto stored as a last message cell with the time slot with the another message cell to form a list having the same time slot in that a pointer in the memory location of the other message cell addresses the memory location of the newly arrived message cell.

4. A method according to claim 1 including the steps of providing the calendar with a pair of memory elements for every message cell cycle, whereby the one memory element as a calendar entry head is capable of addressing a first memory location and the other memory element as a calendar entry tail is capable of addressing a last memory location of a list.

5. A method according to claim 1 wherein, when a pair of memory cells whose entries indicate a list of memory locations is met by the time pointer, said list of memory locations is entered into the output list.

6. A method according to claim 1 wherein memory locations not required at the moment are combined to form a free list.

7. A method according to claim 1 including the step of providing a multiplexer that is capable of through-connecting message cells of different virtual connections supplied on one or more of the input lines onto only said one output line.

8. A method according to claim 1 wherein a sum of average message cell rates of all virtual connections established at the moment is at most as great as a maximum message cell rate of the output line.

9. A method for statistical multiplexing of message cells in a switching equipment that is capable of through connecting message cells of virtual connections onto output lines which are incoming on different input lines of the switching equipment, comprising the steps of:

providing a message cell cycle according to a transmission duration of a message cell given a defined transmission bit rate;

bringing in a plurality of message cells on the input lines and every message cell cycle, and forwarding at most one message cell onto the output lines, the message cells being forwarded having constant length and being transmitted in the course of virtual connections according to an asynchronous transfer mode;

providing a minimum message cell transmission rate, and providing a maximum number of message cells exceeding the minimum message cell transmission rate for every virtual connection;

providing a memory having a plurality of memory locations for respectively accepting a message cell;

forming a calendar with a plurality of memory elements, said calendar being progressively cyclically driven by a time pointer with every message cell cycle;

identifying a time slot for every incoming message cell upon evaluation of quantities established for the corresponding virtual connection, said time slot indicating a latest allowable time of the incoming message cell must be forwarded;

storing a message cell in a memory location and storing an address of said memory location in a memory element of the calendar that corresponds to the corresponding time slot;

when a memory element with a stored address of a memory location is met by the time pointer indicating a memory location of a message cell, that entering said message cell into an output list for an immediate forwarding onto the output line;

when no message cell is entered in the output list in a momentary message cell cycle, forwarding a read pointer in the calendar up to an entry for a message cell having a next-successive time slot, an entry of only the one message cell into the output list being effected; and when a time slot that lies between momentary positions of the time pointer and of the read pointer is identified for an incoming message cell, directly entering said message cell into the output list.

* * * * *